United States Patent
Gadams

(10) Patent No.: US 8,220,165 B2
(45) Date of Patent: Jul. 17, 2012

(54) SUPPORT FOOT LOCKING ARRANGEMENT FOR A RECIPROCATING TOOL

(75) Inventor: Jeff Gadams, Rolling Meadows, IL (US)

(73) Assignee: Robert Bosch GmbH, Stuttgart, DE (US)

( * ) Notice: Subject to any disclaimer, the term of this patent is extended or adjusted under 35 U.S.C. 154(b) by 710 days.

(21) Appl. No.: 12/012,023

(22) Filed: Jan. 31, 2008

(65) Prior Publication Data

US 2009/0193668 A1  Aug. 6, 2009

(51) Int. Cl.
B27B 9/02 (2006.01)
B27B 11/02 (2006.01)

(52) U.S. Cl. ............... 30/377; 30/375; 30/392

(58) Field of Classification Search ............ 30/371, 30/374, 375, 376, 377, 392, 393
See application file for complete search history.

(56) References Cited

U.S. PATENT DOCUMENTS

| | | | |
|---|---|---|---|
| 3,157,947 | A | 11/1964 | Oleson |
| 5,007,172 | A | 4/1991 | Palm |
| 5,421,091 | A | 6/1995 | Gerritsen, Jr. |
| 6,272,757 | B1 | 8/2001 | Roe |
| 6,308,423 | B1 * | 10/2001 | Ono ............... 30/377 |
| 6,317,988 | B1 * | 11/2001 | Tachibana et al. ....... 30/376 |
| 6,671,969 | B2 | 1/2004 | Phillips et al. |
| 6,851,193 | B2 | 2/2005 | Bednar et al. |
| 7,082,689 | B2 | 8/2006 | Beville et al. |
| 2004/0187321 | A1 | 9/2004 | Hartmann et al. |
| 2005/0183271 | A1 | 8/2005 | Sugiura et al. |
| 2005/0252670 | A1 | 11/2005 | Prell et al. |
| 2005/0262710 | A1 | 12/2005 | Moreno |
| 2006/0101650 | A1 | 5/2006 | Beville et al. |
| 2006/0260141 | A1 | 11/2006 | Phillips et al. |
| 2007/0000137 | A1 | 1/2007 | Beville et al. |
| 2009/0113727 | A1 * | 5/2009 | Chen ............... 30/376 |
| 2009/0193667 | A1 * | 8/2009 | Moreno et al. .......... 30/377 |

FOREIGN PATENT DOCUMENTS

| | | |
|---|---|---|
| CN | 200963713 | 10/2007 |
| GB | 2288568 | 10/1995 |
| GB | 2443073 | 4/2008 |
| JP | 2002052503 | 2/2002 |
| JP | 2005226789 | 8/2005 |

OTHER PUBLICATIONS

International Search Report in corresponding PCT application (i.e. PCT/US2009/032379) mailed Apr. 22, 2009 (5 pages).
International Search Report in PCT application No. PCT/US2009/032387, mailed Apr. 27, 2001 (4 pages).

* cited by examiner

*Primary Examiner* — Hwei C Payer
(74) *Attorney, Agent, or Firm* — Maginot, Moore & Beck

(57) ABSTRACT

A support arrangement for a reciprocating tool comprises a first locking surface adjacent to an adjustable foot guide. The foot guide includes a second locking surface designed to mesh with the first locking surface in a locking engagement. The support arrangement further comprises a lock actuator including a first cam profile. The lock actuator is provided adjacent to a cam plate which includes a second cam profile. The second cam profile is configured to interact with the first cam profile and force the first locking surface toward the second locking surface of the foot guide. The lock actuator is moveable between an unlocked position and a locked position, wherein a first raised surface of the first cam profile does not engage a second raised surface of the second cam profile in the unlocked position, while the first cam surface does engage the second raised surface in the locked position.

20 Claims, 9 Drawing Sheets

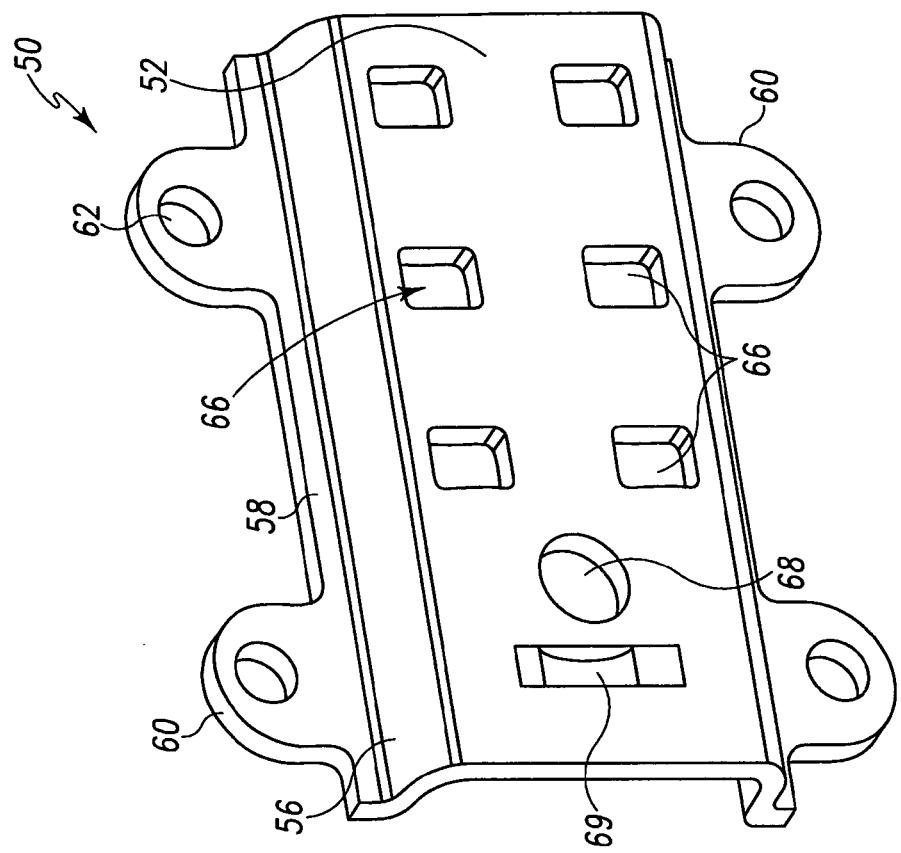
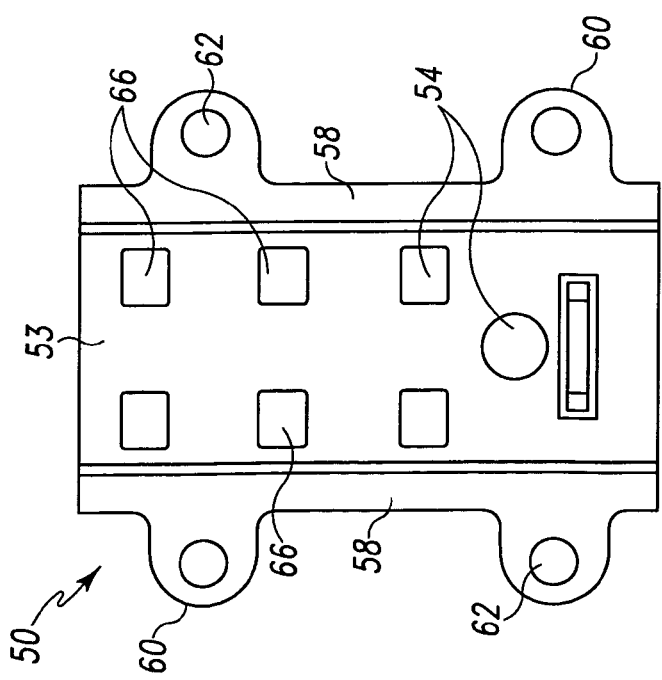
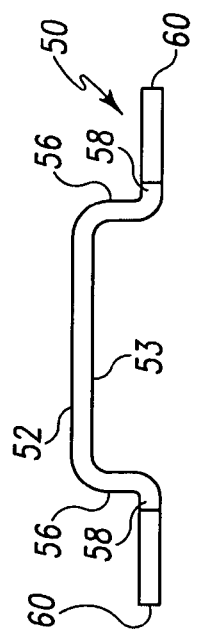
Fig. 3C
Fig. 3A
Fig. 3B

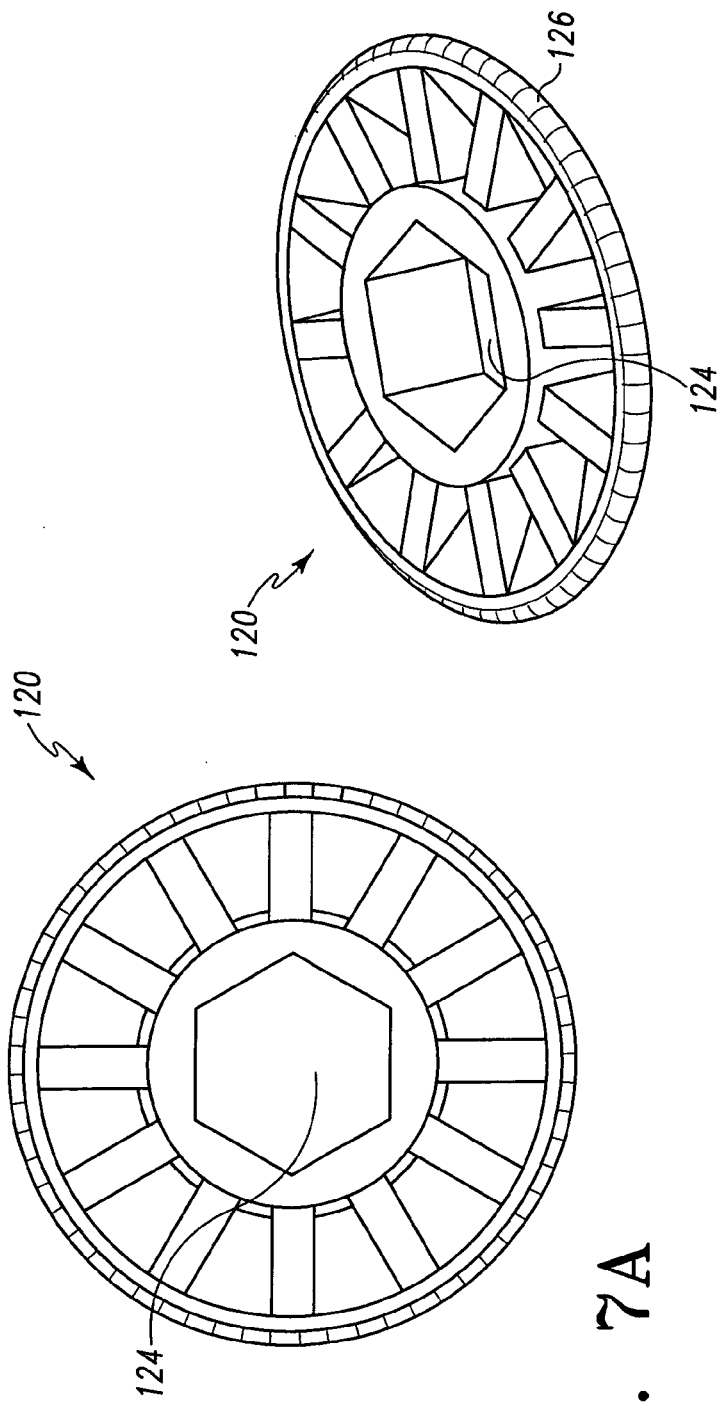
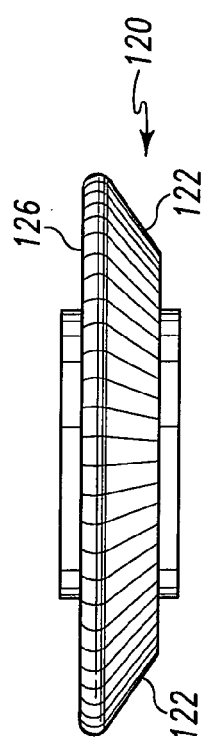
Fig. 7A
Fig. 7B
Fig. 7C

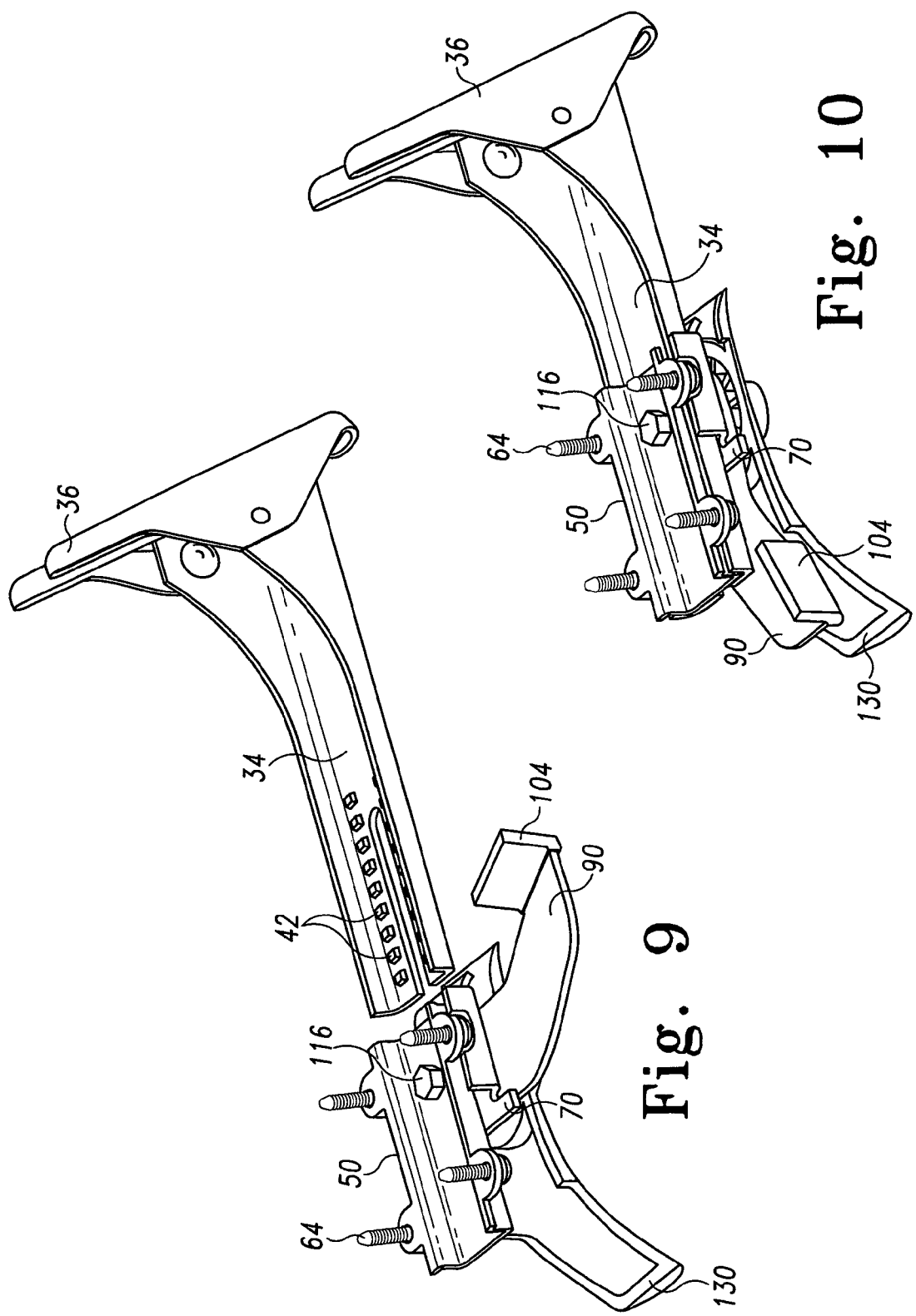

SUPPORT FOOT LOCKING ARRANGEMENT FOR A RECIPROCATING TOOL

CROSS-REFERENCE TO RELATED APPLICATIONS

This application is related to U.S. patent application Ser. No. 12/012,022, entitled "Reciprocating Tool Foot Locking Arrangement", which was also filed on Jan. 31, 2008, the contents of which are incorporated herein by reference.

FIELD

This invention relates to the field of power tools and particularly to reciprocating power tools having a foot support locking arrangement.

BACKGROUND

Reciprocating power tools are well known in the art. Reciprocating tools are characterized by a back-and-forth type motion of a working piece such as a blade. The most commonly known reciprocating tool may be the reciprocating saw, where a cutting action is achieved through a reciprocating motion of a blade. The term "reciprocating saw" is often generically used to refer to any power saw which cuts with a back and forth motion, such as a saber saw, jigsaw, or scroll saws. Because of the reciprocating nature of the instrument, these power saws are high vibration instruments.

Many reciprocating saws, such as the saber saw and the jigsaw, include a handle or grip area on the main housing. The handle allows the user to easily position the saw in various orientations, including positions for horizontal work and vertical work. Opposite the handle is a blade with a "foot" or "shoe" at the base of the blade. The user rests the foot against the surface being cut and applies a force against the surface to stabilize the high vibration instrument. During cutting, the stabilization provided by the foot reduces the tendency of the blade to push away from or pull towards the cut as the blade travels through its cycle, thus allowing the blade to make a cleaner cut.

The foot of the saw is often adjustable relative to the blade. In these arrangements, the foot is typically configured to telescope in and out from the main body of the saw housing. A foot guide is provided which slideably attaches to the housing of the saw, allowing the foot to move toward and away from the saw housing. This adjustable action of the foot allows the user to control the depth of the cut made with the saw. The adjustable foot also makes it possible to evenly distribute wear on the blade.

When the foot of a reciprocating saw is adjustable, secure retention of the foot upon the main housing during cutting is desirable. However, the ability to securely retain the foot upon the saw is problematic in part because of the need to maintain tolerances between the mating components related to the adjustment mechanism, e.g., the foot guide and a bracket on the saw housing engaging the foot guide. In addition to the clearances required for operation of the adjustment mechanism, additional clearances are created between the components with use of the tool as the components wear over time. For example, when the saw blade becomes caught in a work piece forces will be transferred to the components, and any looseness between the components accelerates wear. Accordingly, it would be desirable to provide a reciprocating tool having a support arrangement for an adjustable foot, where the support arrangement may be secured to the saw in such a way that clearances between components of the arrangement can be minimized, thus reducing wear on the components during operation of the saw.

SUMMARY

In at least one embodiment, a support arrangement for a reciprocating tool comprises a first locking surface provided on a locking plate. The locking plate is provided adjacent to an adjustable foot guide. The foot guide includes a second locking surface designed to mesh with the first locking surface in a locking engagement. The support arrangement further comprises a lock actuator, such as a lever, which includes a first cam profile. The lock actuator is provided adjacent to a cam plate which includes a second cam profile. The second cam profile is configured to interact with the first cam profile and force the first locking surface toward the second locking surface of the foot guide. The lock actuator is moveable between an unlocked position and a locked position, wherein a first raised surface of the first cam profile does not engage a second raised surface of the second cam profile in the unlocked position, while the first cam surface does engage the second raised surface in the locked position.

In at least one embodiment, the first locking surface of the locking plate comprises a plurality of depressions and the second locking surface of the foot guide comprises a plurality of protrusions. The plurality of protrusions are driven into deeper engage the plurality of depressions when the first locking surface is forced toward the second locking surface of the foot guide.

In at least one embodiment, a fastening member such as a bolt extends through the locking plate, the foot guide, the lock actuator and the cam member. An adjustment member such as a clamping nut engages the end of the fastening member. The adjustment member is moveable upon the fastening member to tighten the locking plate, the foot guide, the lock actuator and the cam member upon the fastening member.

The above described features and advantages, as well as others, will become more readily apparent to those of ordinary skill in the art by reference to the following detailed description and accompanying drawings.

BRIEF DESCRIPTION OF THE DRAWINGS

FIG. 3A shows a top view of a locking plate of the support foot locking arrangement of FIG. 2;

FIG. 3B shows a front view of the locking plate of FIG. 3A;

FIG. 3C shows a lower perspective view of the locking plate of FIG. 3A;

FIG. 7A shows a top view of a thumb wheel of the support foot locking arrangement of FIG. 2;

FIG. 7B shows a side view of the thumb wheel of FIG. 7A;

FIG. 7C shows an upper perspective view of the thumb wheel of FIG. 7A;

FIG. 9 shows an upper perspective view of the support foot locking arrangement of FIG. 2 with the lever in an open position and the support foot assembly completely removed from the locking plate; and FIG. 10 shows an upper perspective view of the support foot locking arrangement of FIG. 2 with the support foot assembly engaging the locking plate and the lever in a closed position.

DESCRIPTION

Figure 1:
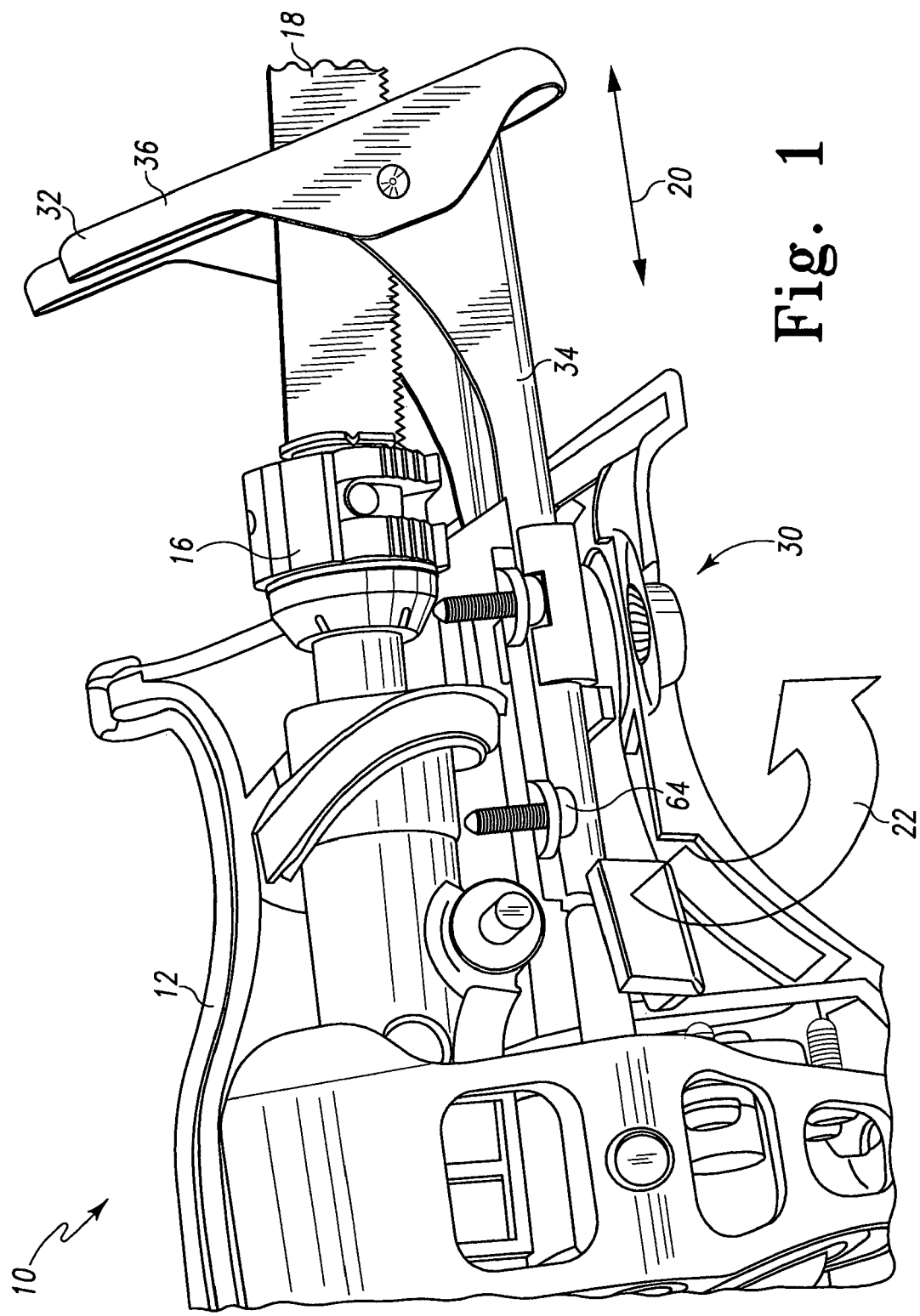
FIG. 1 shows a perspective cutaway view of a support foot locking arrangement positioned in a reciprocating saw.

With reference to FIG. 1, an end of a reciprocating saw 10 is shown having an exemplary embodiment of a support foot locking system/arrangement 30 attached thereto. The reciprocating saw includes a tool housing 12 with a motor and a drive train (not shown) positioned therein. A chuck 16 is attached to the drive train. The chuck 16 is designed to hold a blade 18. The drive train translates rotary motion of the motor into reciprocating motion at the chuck 16. Accordingly, the saw blade 18 retained within the chuck 16 moves back-and-forth during operation of the reciprocating saw, allowing the user to cut with the blade 18 of the saw.

The foot support locking arrangement 30 is secured to the housing 12 of the reciprocating saw 10. The foot support locking arrangement 30 includes a support foot assembly 32 comprising a foot 36 retained by a foot guide provided in the form of a foot guide plate 34. In the embodiment disclosed herein, the foot 36 is pivotably attached to the foot guide plate 34. In other embodiments, the foot 36 could be integral with or stationary with respect to the foot guide plate 34.

Figure 2:
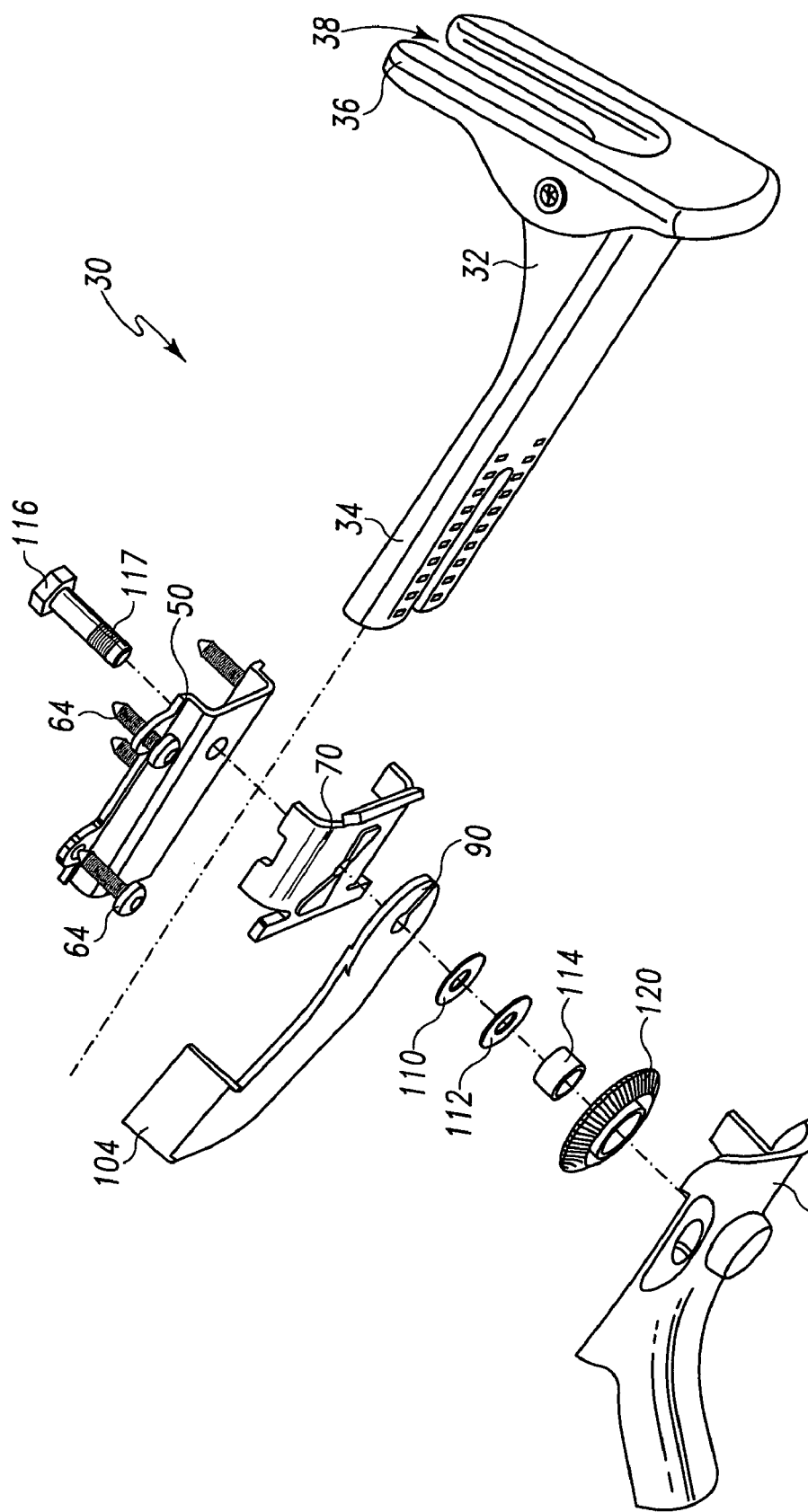
FIG. 2 shows an exploded isometric view of the support foot locking arrangement of FIG. 1.

The support foot assembly 32 is adjustably secured to the reciprocating saw 10 through the foot guide plate 34. In particular, the foot guide plate 34 may be adjusted in an axial direction relative to the saw blade 18, as indicated by arrow 20. The saw blade 18 extends through a slot 38 formed in the foot 36. The support foot 36 is designed to rest against a surface such that a user may cut the surface with the portion of the blade 18 extending past the foot 36. It will be recognized that the foot, as well as other components of the arrangement, may take on numerous different configurations from that shown in the disclosed embodiment FIG. 2 shows an exploded isometric view of the support foot locking arrangement 30. As shown in FIG. 2, the foot guide plate 34 of the support foot locking arrangement 30 is positioned between a locking plate 50 and a cam plate 70. A tension lever 90 is positioned next to an under side of the cam plate. A thrust washer 110, a conical spring washer 112, a clamping nut 114, a thumb wheel 120, and a support plate 130 are provided under the tension lever 90.

A locking bolt 116 extends through the locking plate 50, the cam plate 70, the foot guide plate 34, and the clamping nut 114. The locking bolt includes a lower threaded portion 117 configured to threadedly engage the clamping nut 114. The clamping nut 114 may be rotated on the locking bolt 116, moving the clamping nut 114 axially along the bolt 116 and either tightening or loosening the relationship between the components of the foot support locking arrangement 30. The components of the foot support locking arrangement 30 are generally comprised of a rigid material, such as, for example, steel or some other metal or metal alloy. Of course, those in the art will recognize that numerous other or additional materials may also be used for the components of the foot support locking arrangement.

With reference now to FIGS. 2 and 3A-3C, the locking plate 50 includes a rectangular locking surface 52 including a plurality of recesses 54 formed in the locking surface 52. Two sidewalls 56 extend away from the locking surface 52 in a generally perpendicular fashion. On the opposite end of each sidewall 56, a lip 58 is formed with tabs 60 protruding from the lip 58. The lips 58 and tabs 60 are oriented in a parallel fashion to the locking surface 52. The tabs 60 include holes 62 configured to receive fastening members, and particularly bolts 64 (see FIG. 2). These bolts 64 are used to secure the locking plate 50 directly to the housing 12 of the reciprocating saw, or to a mounting bracket secured to the housing of the reciprocating saw 10.

The recesses 54 in the locking surface 52 include a plurality of rectangular locking holes 66 that extend through the locking plate 50 along with a circular bore 68. The locking holes 66 are formed in two parallel rows on the locking surface 52. As explained further below, these locking holes 66 are configured to receive protrusions on the foot guide plate 34, locking the foot guide plate 34 in place relative to the locking plate 50. The circular bore 68 is configured to receive the locking bolt 116 which extends through the components of the support foot locking arrangement 30. A detent 69 is also formed in the locking plate. The detent 69 does not extend through the plate 50, but instead provides a recess in the locking surface 52, and a protrusion on the opposite side 53 of the locking surface.

Figure 4:
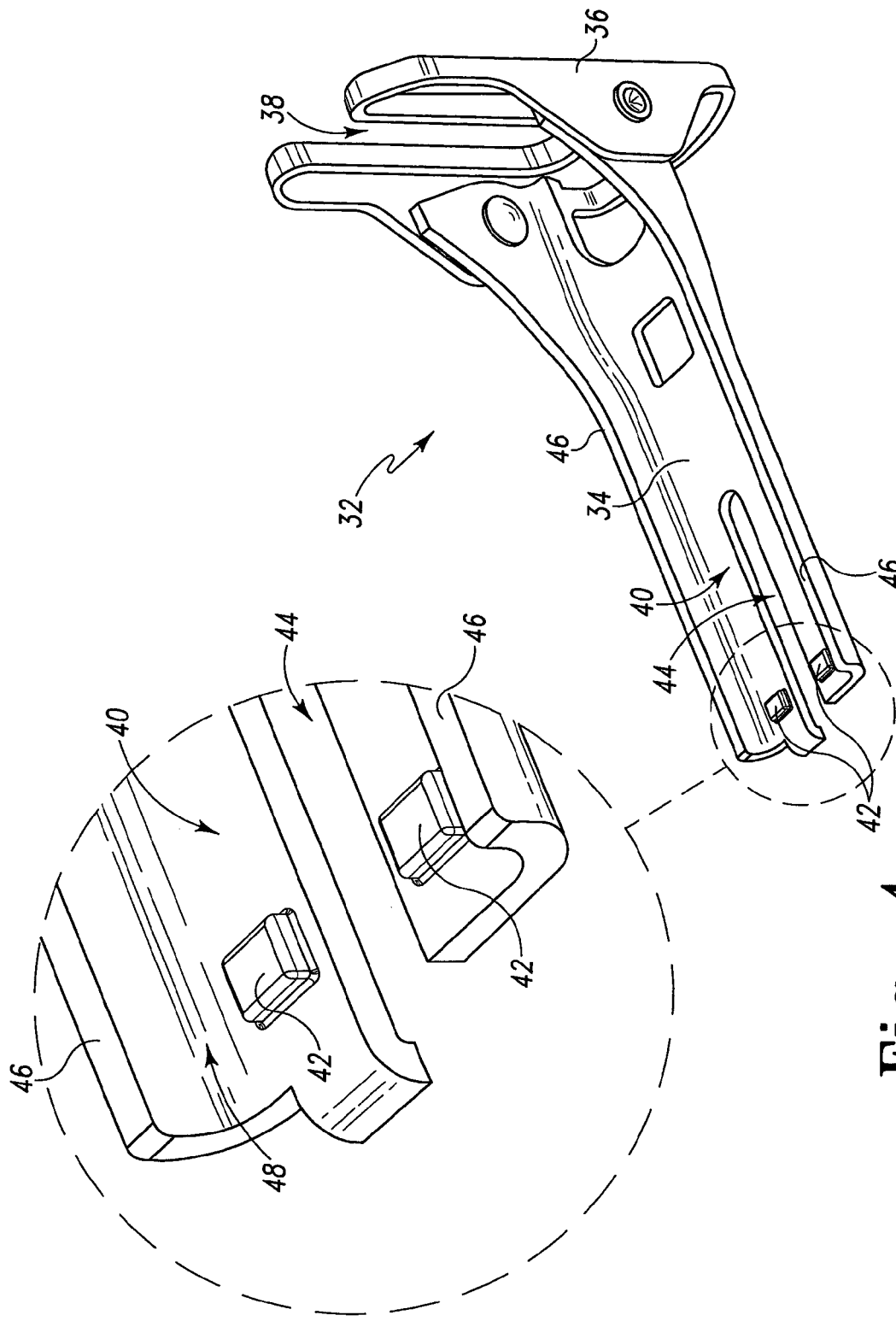
FIG. 4 shows an upper perspective view of the support foot assembly of the support foot locking arrangement of FIG. 2.

With reference now to FIGS. 2 and 4, the foot guide plate 34 of the support foot assembly 32 is configured to engage the locking surface 52 of the locking plate 50. The foot guide plate 34 includes an upper contact surface 40 with two protrusions 42 extending from the upper contact surface 40. A slot 44 is formed between the protrusions 42 and extends axially along the plate. The slot 44 is dimensioned such that the locking bolt 116 can pass through the foot guide plate 34 at various locations along the slot 44. Two sidewalls 46 extend in a generally perpendicular fashion from the edges of the upper contact surface 40.

The upper contact surface 40 and sidewalls 46 of the foot guide plate 34 form a channel 48 configured receive the locking plate 50. When the locking plate 50 is placed in the channel 48 with the locking surface 52 of the locking plate 50 facing the upper contact surface 40 of the foot guide plate 34, the protrusions 42 of the foot guide plate 34 may be received by the locking holes 66 of the locking plate 50. The protrusions 42 of the foot guide plate 34 mesh with the holes 66 in the locking plate 50 in an interlocking engagement, locking the two plates 34 and 50 together. The protrusions 42 are arranged to fit in each of the different holes 66 on the locking plate, thus providing an adjustable relationship between the locking plate 50 and the foot guide plate 34, where the relationship between the two plates depends on the locking holes 66 chosen by the user to mesh with the protrusions 42.

The protrusions 42 of the foot guide plate 34 are further dimensioned to fit snugly within the holes 66 of the locking plate 50. This provides a secure relationship between the locking plate 50 and the foot guide plate 34. In one embodiment, the protrusions 42 and/or holes 66 may be slightly tapered such that the protrusions 42 fit more snugly in the holes 66 as the foot guide plate 34 is forced closer to the locking plate 50. This arrangement allows the protrusions 42 to easily make initial engagement with the holes 66 of the locking plate, and the secure the foot guide plate 34 in place as it is forced into closer interlocking contact with the locking plate 50.

In the disclosed embodiment of FIG. 4, two rectangular protrusions 42 are shown on the foot guide plate 34 and spaced apart to fit precisely within the equally separated and complimentary sized rectangular holes 66 of the locking plate 50. It will be recognized that in other embodiments different numbers of protrusions and/or holes may be used on the locking plate 50 and the foot guide plate 34. In addition, it will be recognized that different protrusion/hole configurations are possible, and different types of locking relationships are possible.

With reference now to FIGS. 2 and 5A-5C, the cam plate 70 is provided to engage the foot guide plate 34. The cam plate 70 is generally rectangular in shape and includes an upper surface 72, a lower surface 74, a front lip 76, a rear flange 78, and two side wings 80 that extend upward from the upper surface 72. The upper surface 72 is generally smooth and flat with depressions formed in the surface. One of the depressions is a hole 73 that extends through the cam plate 70 and is configured to receive the locking bolt 116. The other depressions on the upper surface 72 are footprints 75 of protrusions on the lower surface 74. As described below, these protrusions form a cam surface 82 on the lower surface 74 of the cam plate 70.

The side wings 80 of the cam plate 70 extend upward from the upper surface 72 and are configured to wrap around the sidewalls 46 of the foot guide plate 34. The front lip 76 bends downward at an acute angle relative to the plane of the upper surface 72, thus providing a tapered entrance to the upper surface 72 when the foot guide plate 34 is inserted between the cam plate 70 and the locking plate 50. When the foot guide plate 34 is inserted between the cam plate 70 and the locking plate, the three plates are nested with the cam plate 70 providing the outer member, the foot guide plate 34 providing the middle member, and the locking plate 50 comprising the inner member. As discussed previously, the inner member 50 is secured to the housing 12 of the reciprocating saw, and the middle member 34 is adjustable relative to the inner member 50 and outer member 70.

Figure 5A:
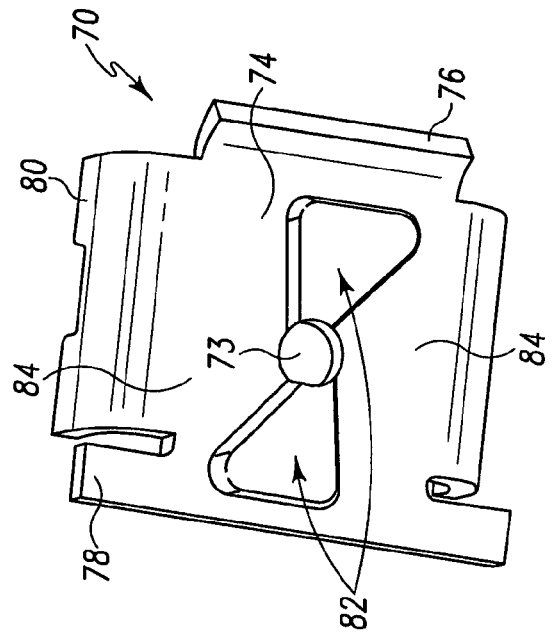
FIG. 5A shows an upper perspective view of a cam plate of the support foot locking arrangement of FIG. 2.
Figure 5B:
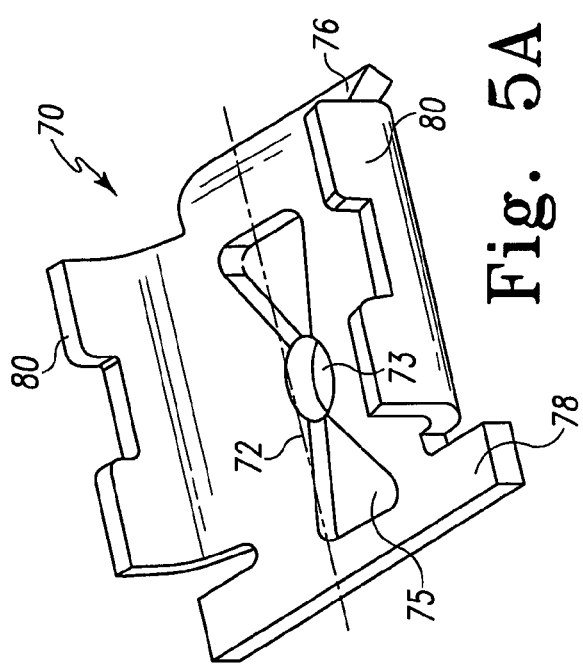
FIG. 5B shows a lower perspective view of the cam plate of FIG. 5A.
Figure 5C:
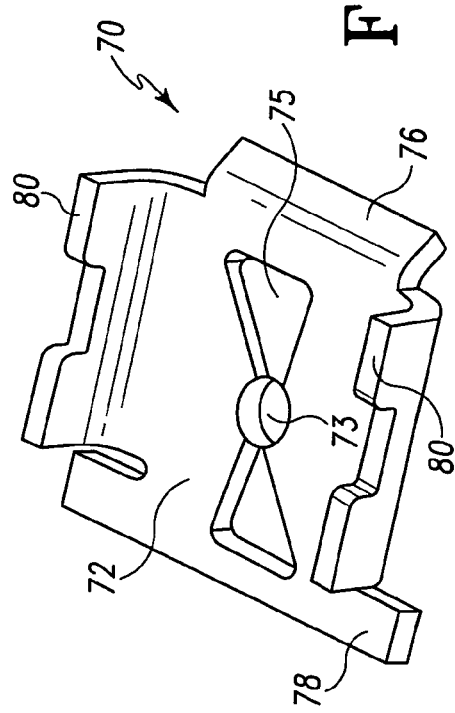
FIG. 5C shows another top perspective view of the cam plate of FIG. 5A.
Figure 6A:
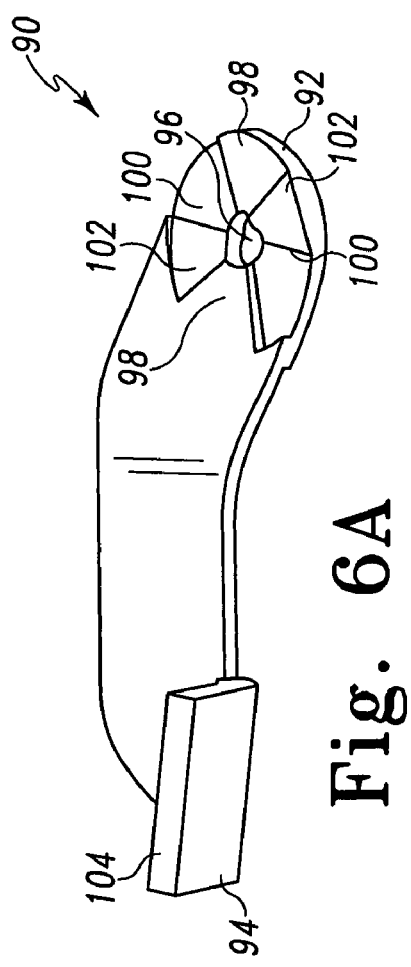
FIG. 6A shows an upper perspective view of a tension lever of the support foot locking arrangement of FIG. 2.
Figure 6B:
FIG. 6B shows a top view of the tension lever of FIG. 6A.
Figure 6C:
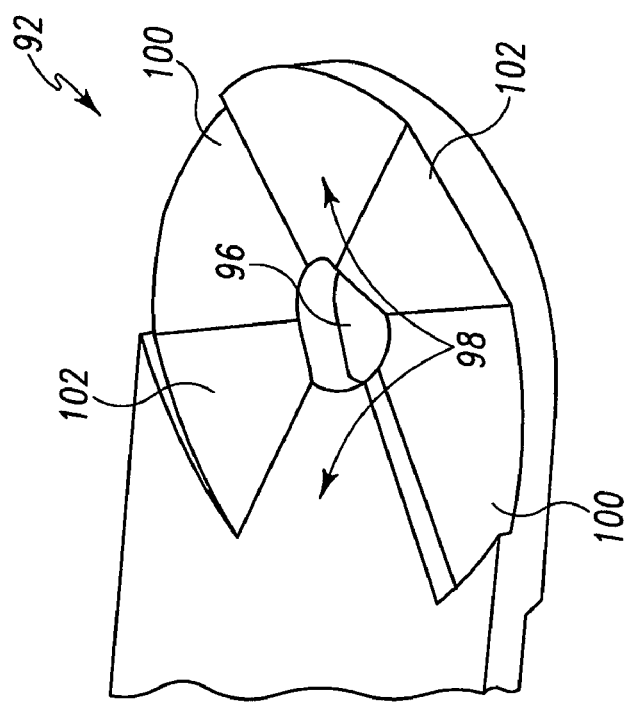
FIG. 6C shows an upper perspective view of a pivoting end of the tension lever of FIG. 6A.

With particular reference to FIG. 5B, the lower surface 74 of the cam plate 70 is shown. The depressions in the upper surface 72 of the cam plate are translated into protruding cam surfaces 82 on the lower surface 74 of the cam plate 70, i.e., the cam surfaces 82 extend outward from the main portion 84 of the lower surface 74 of the cam plate. The hole 73 in the cam plate 70 is provided between the two triangular cam surfaces 82. The cam surfaces 82 are generally triangular in shape. The edges of the cam surfaces 82 are tapered, providing a ramp effect between the main portion 84 of the lower surface 74 and the protruding cam surfaces 82. With the cam surfaces 82 provided in a different plane than the main portion 84 of the lower surface 74, a cam profile is created on the lower surface 74 of the cam plate 70.

With reference now to FIGS. 2 and 6A-6C, the tension lever 90 is provided in the form of a curved plate having a pivoting end 92 and a handle end 94. The pivoting end 92 of the tension lever 90 is rounded and a hole 96 is provided at the center of the rounded portion. The hole 96 is configured to pass the locking bolt 116 through the tension lever 90.

Cam surfaces 98 are formed radially outward from the hole 96. The cam surfaces 98 are provided above a depressed surface portion 100 on the pivoting end 92 of the lever 90. Ramp surfaces 102 extend between the cam surfaces 98 and the depressed surface portion 100. With the cam surfaces 98 in a different plane than the depressed surface portion 100, a cam profile is created on the pivoting end 92 of the lever 90. The cam surfaces 98 provided on the lever 90 are designed to engage the cam surfaces 82 provided on the cam plate 70. In particular, as discussed in further detail below, rotation of the lever 90 from an unlocked position and a locked position results in the cam surfaces 98 of the lever 90 moving from disengagement to engagement with the cam surfaces 82 of the cam plate 70.

A handle 104 is provided on the handle end 94 of the lever 90. The handle 104 is provided as a flange which extends above the rest of the lever 90 in a generally perpendicular fashion. The handle 104 is sufficiently large that a human finger may be placed against the surface of the handle 104 to facilitate rotation of the lever 90. The handle 104 may include an exterior surface formed of an insulating material, such as a rubber or soft plastic material. The insulating material provided on the exterior surface of the handle provides more comfort to the human hand when grasping and rotating the handle 104.

With reference now to FIGS. 2 and 7A-7C, the thumb wheel 120 is a disc-shaped member with a frusto-conical surface 122. The frusto-conical surface may be textured, such as with a plurality of radial grooves 126. Surface texturing provides for additional friction between a human finger and the surface of the thumb wheel 120, thus allowing the human to more easily rotate the thumb wheel.

A hexagonal void 124 is formed at the center of the thumb wheel 120. This hexagonal void 124 is designed and dimensioned to loosely receive the clamping nut 114. With the clamping nut 114 situated in the center of the thumb wheel 120, rotation of the thumb wheel 120 results in rotation of the clamping nut 114. As the clamping nut 114 is rotated by the thumb wheel 120, the clamping nut is allowed to move up or down within the hexagonal void 124.

Figure 8C:
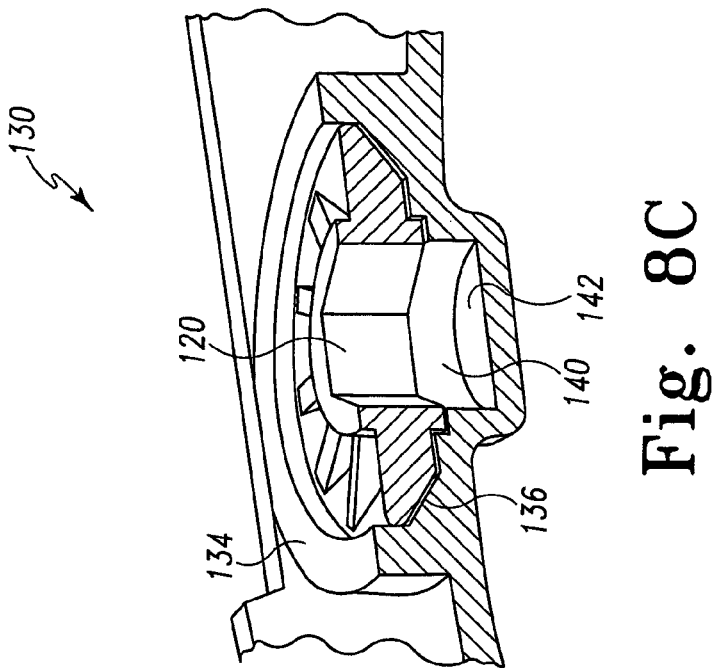
FIG. 8C shows a perspective cutaway view of the support plate of FIG. 8A.
Figure 8A:
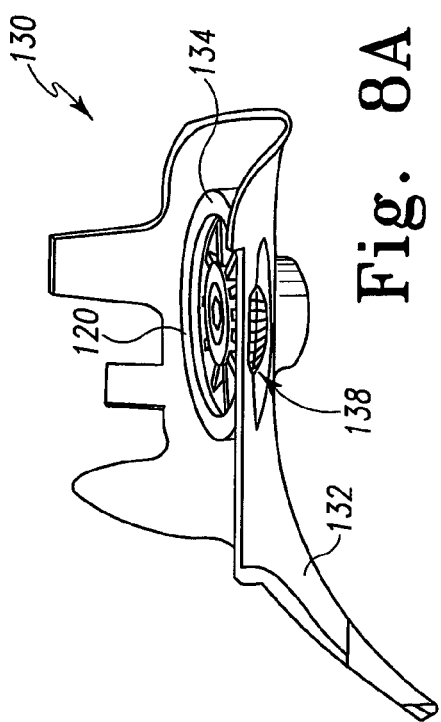
FIG. 8A shows an upper side perspective view of a support plate of the support foot locking arrangement of FIG. 2 with the thumb wheel positioned therein.
Figure 8B:
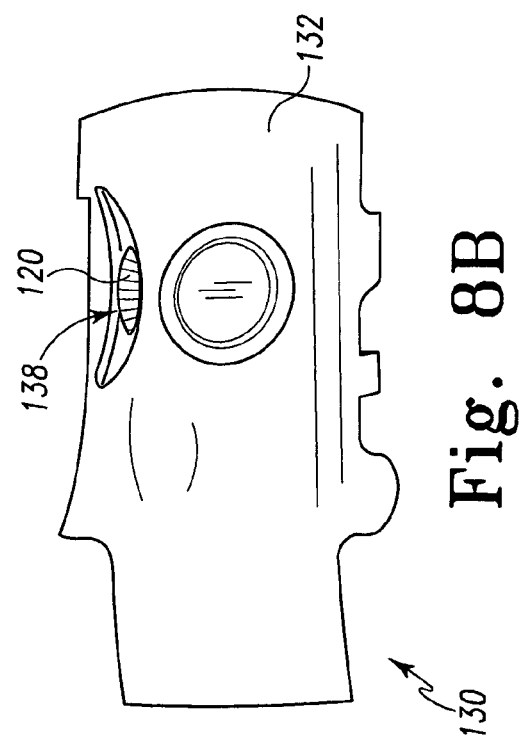
FIG. 8B shows a bottom view of the support plate of FIG. 8A.

With reference now to FIGS. 2 and 8, the support plate 130 is provided as a portion of the reciprocating saw housing 12. In particular, the support plate 130 forms a lower portion of the housing 12 below the reciprocating chuck 16 (see FIG. 1). The support plate 130 is fastened to the rest of the housing 12 using fastening means such as bolts (not shown). Alternatively, the support plate 130 may be integrally formed with other portions of the saw housing 12.

The support plate 130 generally comprises a contoured panel 132 that leads to the mouth of the reciprocating saw 10. A thumb wheel seat 134 is formed at the lowermost portion of the panel 132. The thumb wheel 120 is secured within the thumb wheel seat 134 of the support plate 130, but the thumb wheel 120 is free to rotate within the seat 134. As shown in FIG. 8C, the thumb wheel seat 134 includes a frusto-conical depression 136 designed and dimensioned to receive the thumb wheel 120. An opening 138 in the panel 132 at the seat 134 provides the user with access to a portion of the textured frusto-conical surface 122 of the thumb wheel 120 held within the seat 134. As also shown in FIG. 8C, the seat 134 includes a lower cavity 140 which extends to a floor 142. The clamping nut 114 is free to slide vertically within the thumb wheel 120 as far as the floor 142 when the thumb wheel 120 is rotated and the clamping nut moves along the axis of the locking bolt 116. The threaded portion 117 of the locking bolt 116 extends through the seat 134 and to floor 142 or close to the floor to facilitate this movement of the clamping nut 114.

As indicated in FIG. 2, the locking bolt 116 extends through each of the locking plate 50, cam plate 70, tension lever 90, thrust washer 110, conical spring washer 112, clamping nut 114, and thumb wheel 120, and into the seat of the support plate 130. Thus, the support foot locking arrangement 30 is held together within the housing 12 by the locking bolt 116 and clamping nut 114. As explained below, the thumb wheel 120 and tension lever 90 work together to engage the support foot assembly 32 in either a locked position or an unlocked position.

FIG. 9 shows the lever 90 of the support foot locking arrangement 30 in an open position with the other components of the system 30 retained upon the locking bolt in a loose-fitting relationship. In this configuration, the foot guide plate 34 is slideable with respect to the locking plate 50 and the cam plate 70, such that the protrusions 42 on the foot guide plate 34 may be selectively inserted in any of the locking holes 66 of the locking plate. Furthermore, in this configuration, the foot guide plate 34 may be completely released from the other components of the system 30, as shown in FIG. 9, where the support foot assembly 32 is removed from the locking plate 50 and cam plate 70.

When the lever 90 is in the open position shown in FIG. 9, the raised cam surfaces 98 on the pivoting end 92 of the lever (see FIG. 6C) do not engage the raised cam surfaces 82 of the cam plate (see FIG. 5B). Instead, the cam surfaces 98 of the lever 90 are positioned between the cam surfaces 82 of the cam plate 70, and engage the main portion 84 of the lower surface 74, with the lever in the open position. Likewise, the cam surfaces 82 of the cam plate 70 are positioned between the cam surfaces 98 of the lever 90, and engage the depressed surface portion 100 of the lever. Because the cam surfaces 98 of the lever 90 do not engage the cam surfaces 82 of the cam plate with the lever in the open position, additional clearance is provided between the components of the support foot locking arrangement 30. Provided the locking nut 114 is sufficiently low on the locking bolt 116, the components of the support foot locking arrangement 30 will be only loosely engaged when the lever 90 is in the open position. This allows the support foot assembly 32 to be easily adjusted by the user by sliding the foot guide plate 34 between the locking plate 50 and the cam plate 70. The user may choose to position the foot guide plate 34 in any of several positions where the protrusions 42 mesh with the locking holes 66 of the locking plate 50.

After adjusting the support foot assembly 32 to the desired position as set forth above, the user locks the support foot assembly 32 in place by first rotating the thumb wheel 120 such that the clamping nut 114 moves upward on the locking bolt 116. By rotating the thumb wheel 120 in this fashion, the clamping nut 116 forces the components of the support foot locking arrangement 30 into a tighter engagement upon the locking bolt 116, and the protrusions 42 on the foot guide plate 34 are driven further into the aligned locking holes 66 on the locking plate 50. Thus, the thumb wheel 120 and clamping nut 114 arrangement provides a coarse tightening feature for the support foot locking arrangement 30 prior to activation of the lever 90. It will be noted that the thumb wheel 120 and clamping nut 114 are not associated with any defined locked positions or unlocked positions upon the bolt 116. Instead, the thumb wheel 120 and clamping nut 114 can each be rotated to any of an infinite number of positions upon the bolt. Accordingly, the thumb wheel 120 and clamping nut may be considered "infinitely adjustable," such that each change in the position of the thumb wheel results in a related change to the position of the foot guide plate 34 relative to the locking plate 50. It will be recognized that adjusting the thumb wheel to an extremely tight position (e.g., past a "hand-tight" position) will make rotation of the lever 120 difficult. Accordingly, the thumb wheel 120 is considered a coarse tightening feature for the support foot locking arrangement.

After the user rotates the thumb wheel 120 to a "hand-tight" position, the user actuates the lock by rotating the lever 90, moving the lever from the "open" or "unlocked" position of FIG. 9 to the "closed" or "locked" position of FIG. 10. To accomplish this, the user presses against the handle 104, forcing it back toward the housing 12 of the reciprocating saw 10, thus rotating the lever 90 into the locked position shown in FIG. 10. When the lever 90 is rotated in this manner, the cam surfaces 98 of the lever 90 are brought into engagement with the cam surfaces 82 of the cam plate. This engagement is facilitated by the tapered edges of the cam surfaces 82 of the cam plate 70 and the ramp surfaces 102 positioned on the lever 90 between the cam surfaces 98 and the surface portion 100. In particular, as the lever 90 is rotated from the unlocked position to the locked position, the ramp surfaces 102 of the lever travel along the cam surfaces 82 of the cam plate until the cam surfaces 98 of the lever 90 engage the cam surfaces 82 of the cam plate. When the cam surfaces 82 and 98 are engaged, the components of the support foot locking arrangement 30 are brought into tighter engagement. Therefore, rotating the lever from the unlocked position of FIG. 9 to the locked position of FIG. 10 drives the components of the support foot locking arrangement 30 closer together, thus reducing clearances between the components, including driving the protrusions 42 of the foot guide plate 34 into a deeper interlocking mesh with the locking holes 66 on the locking plate 50. This deep interlock between the foot guide plate 34 and the locking plate 50 provides a secure relationship between the support foot assembly 32 and the rest of the reciprocating saw 10. Additionally, the other components of the support foot locking arrangement 30 are compressed together when the lever is in the locked position. After using the saw 10 with the lever in the locked position, the user may adjust the support foot assembly by rotating the lever (as noted by arrow 22 in FIG. 1), from the locked position to the unlocked position.

Although the present invention has been described with respect to certain preferred embodiments, it will be appreciated by those of skill in the art that other implementations and adaptations are possible. For example, the locking holes on the locking plate could be easily replaced with locking protrusions, and the locking protrusions on the foot guide plate could be easily replaced with locking holes. As another example, additional numbers or configurations of locking protrusions and locking holes could be provided. As yet another example, the foot guide could be provided using rods or other members other than a plate. Numerous other alternative embodiments are also possible. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A support arrangement for a reciprocating tool, the support arrangement comprising:
   a) a first locking surface;
   b) a foot guide movable along a guide axis and including a second locking surface provided adjacent to the first locking surface, wherein the second locking surface is designed to mesh with the first locking surface in a locking engagement;
   c) a rotatable lock actuator including a first cam profile; and
   d) a cam member including a second cam profile, the second cam profile located at a fixed position along the guide axis and configured to interact with the first cam profile and force the second locking surface toward the first locking surface.

2. The support arrangement of claim 1 wherein the first cam profile comprises at least one first raised surface on the lock actuator and the second cam profile comprises at least one second raised cam surface on the cam member.

3. The support arrangement of claim 2 wherein the lock actuator is rotatable between an unlocked position and a locked position, wherein the first raised surface does not engage the second cam raised surface in the unlocked position, and the first raised surface does engage the second raised surface in the locked position.

4. The support arrangement of claim 1 wherein the first locking surface comprises a plurality of depressions and the second locking surface comprises a plurality of protrusions, and wherein the plurality of protrusions engage the plurality of depressions when the second locking surface is forced toward the first locking surface.

5. The support arrangement of claim 1 wherein the first locking surface is provided on a locking plate fixed to the reciprocating tool.

6. The support arrangement of claim 5 further comprising a fastening member and an adjustment member positioned on the fastening member, the fastening member engaging the locking plate, the foot guide, the lock actuator and the cam member, wherein the adjustment member is moveable upon the fastening member to tighten the locking plate, the foot guide, the lock actuator and the cam member upon the fastening member.

7. The support arrangement of claim 6 wherein the fastening member comprises a bolt extending through the locking plate, the foot guide, the lock actuator and the cam member, wherein the adjustment member comprises a nut threaded on the bolt, and wherein the nut is provided as the hub of a thumb wheel.

8. The support arrangement of claim 1 wherein the foot guide is adjustable relative to the first locking surface.

9. The support arrangement of claim 1 wherein the lock actuator is a lever and the cam member is a cam plate.

10. The support arrangement of claim 1, wherein:
the rotatable lock actuator is rotatable about a pivot axis; and
the cam member is configured to interact with the first cam profile to force the second locking surface toward the first locking surface along the pivot axis.

11. The support arrangement of claim 10, wherein the pivot axis extends through the cam member.

12. A support arrangement for a reciprocating tool, the support arrangement comprising:
a locking plate including a first locking surface;
a foot guide releasably engaging the locking plate, the foot guide including a second locking surface designed to interlock with the first locking surface;
a lock actuator including a first cam profile having a raised portion, the lock actuator movable between an unlocked position and a locked position;
wherein the raised portion of the first cam profile engages a raised portion of a second cam profile provided adjacent to the lock actuator when the lock actuator is in the locked position, forcing the second locking surface toward the first locking surface when the lock actuator is in the locked position; and
wherein the raised portion of the first cam profile is removed from the raised portion of the second cam profile when the lock actuator is in the unlocked position.

13. The support arrangement of claim 12 wherein a plurality of protrusions mesh with a plurality of depressions when the first locking surface interlocks with the second locking surface.

14. The support arrangement of claim 12 wherein the second cam profile is provided on a cam plate adjacent to the lock actuator.

15. The support arrangement of claim 14 wherein the cam plate is positioned between the lock actuator and the foot guide.

16. The support arrangement of claim 12 wherein the lock actuator is a lever.

17. The support arrangement of claim 16 further comprising a fastening member and an adjustment member positioned on the fastening member, the fastening member extending between the locking plate, the foot guide, and the lever, wherein the adjustment member is moveable upon the fastening member to force the locking plate, the foot guide, and the lever together upon the fastening member.

18. The support arrangement of claim 17 wherein the fastening member comprises a bolt extending through the locking plate, the foot guide, and the lever, wherein the adjustment member comprises a nut threaded on the bolt, and wherein the nut is provided as the hub of a thumb wheel.

19. The support arrangement of claim 12, wherein:
the lock actuator is movable about a lock actuator axis; and
the raised portion of the first cam profile engages the raised portion of the second cam profile provided adjacent to the lock actuator when the lock actuator is in the locked position, forcing the second locking surface along the lock actuator axis toward the first locking surface when the lock actuator is in the locked position.

20. The support arrangement of claim 19, wherein the raised portion of the first cam profile is raised with respect to a plane perpendicular to the lock actuator axis.

* * * * *

UNITED STATES PATENT AND TRADEMARK OFFICE
CERTIFICATE OF CORRECTION

PATENT NO. : 8,220,165 B2
APPLICATION NO. : 12/012023
DATED : July 17, 2012
INVENTOR(S) : Jeff Gadams Page 1 of 1

It is certified that error appears in the above-identified patent and that said Letters Patent is hereby corrected as shown below:

In the claims:

Claim 3, line 4 (col. 9, line 11): Replace "second cam raised surface" with --second raised cam surface--

Claim 3, lines 5-6 (col. 9, lines 12-13): Replace "second raised surface" with --second raised cam surface--

Signed and Sealed this
Sixth Day of November, 2012

David J. Kappos
*Director of the United States Patent and Trademark Office*